UNITED STATES PATENT OFFICE.

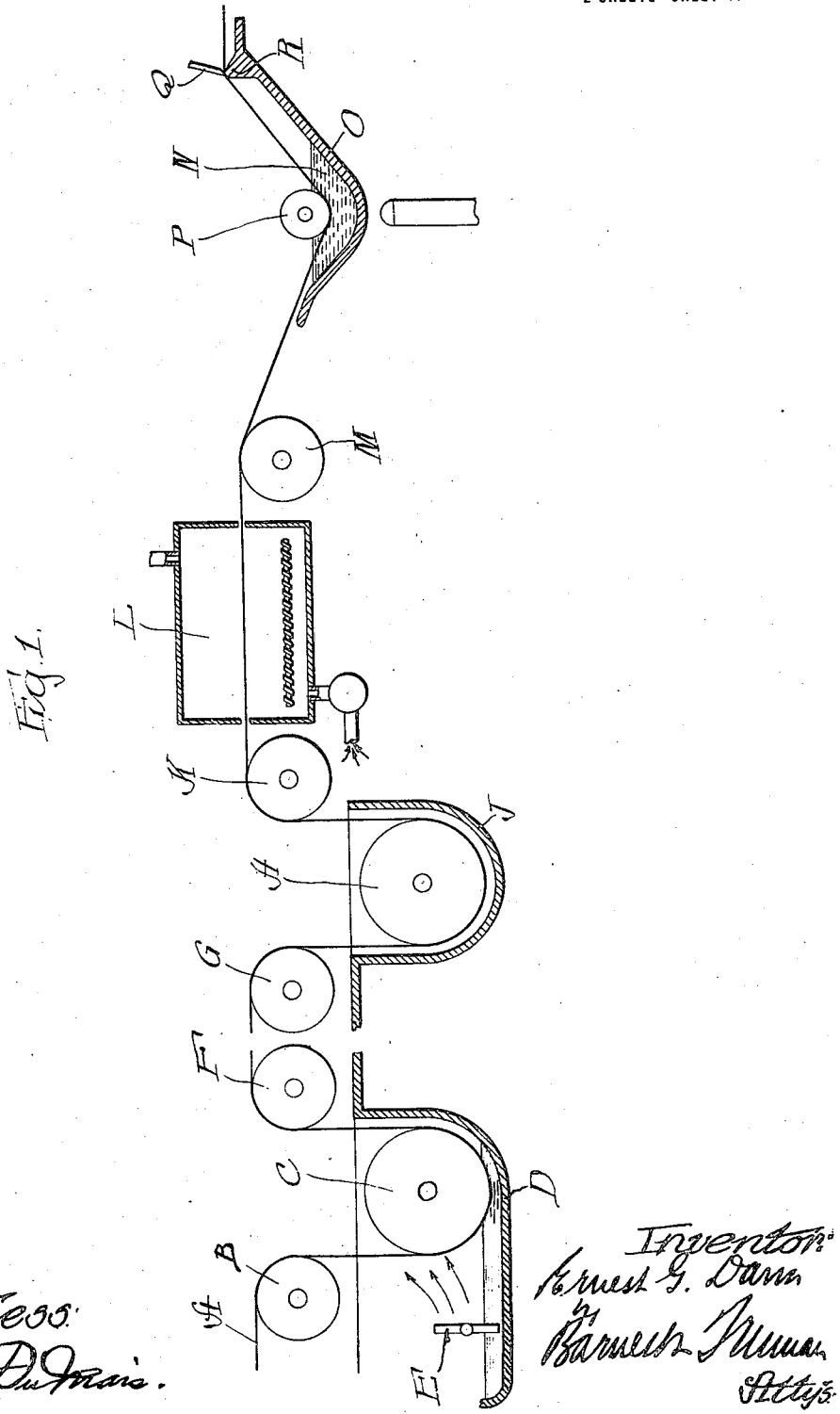

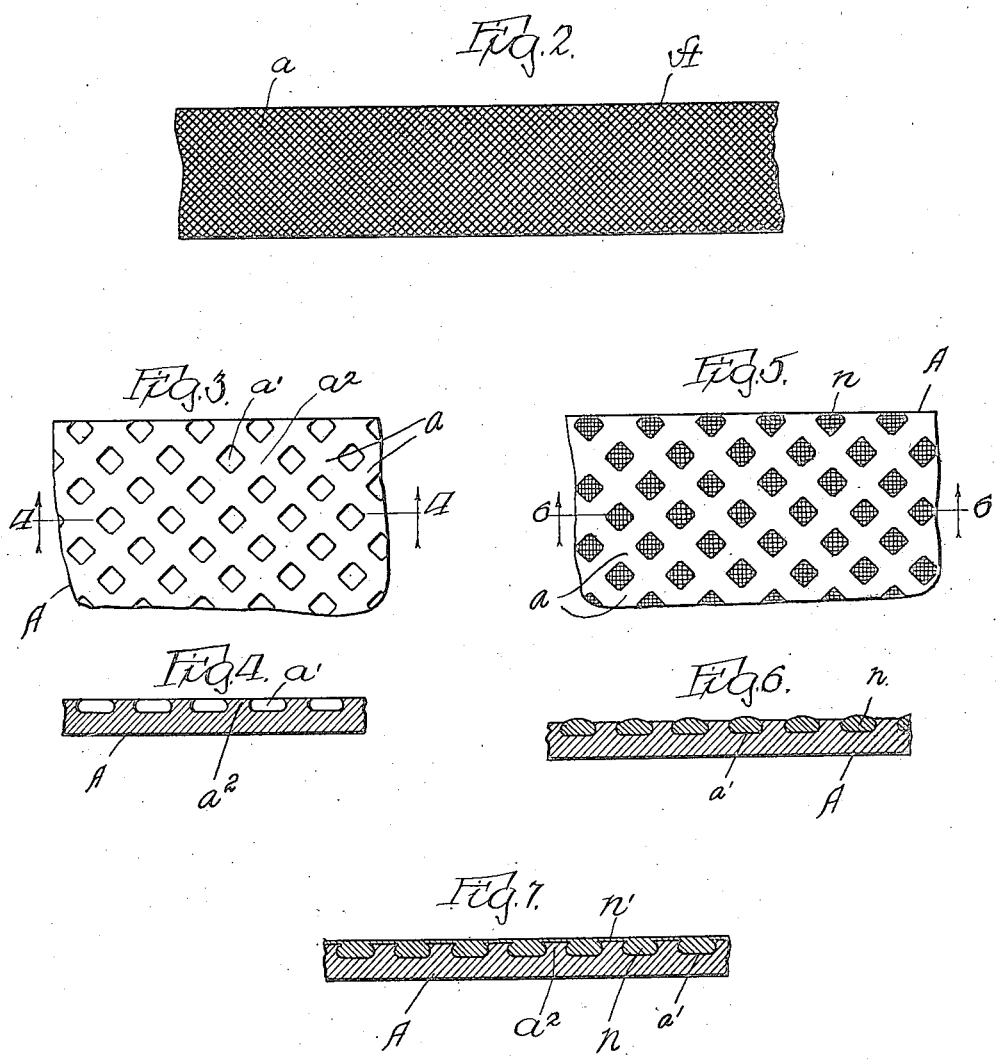

ERNEST G. DANN, OF CLEVELAND, OHIO, ASSIGNOR TO THE DANN PRODUCTS COMPANY, A CORPORATION OF OHIO.

METHOD OF MANUFACTURING COMPOSITE ARTICLES FOR BEARINGS OR OTHER PURPOSES.

1,422,677.  Specification of Letters Patent.  Patented July 11, 1922.

Application filed January 9, 1918, Serial No. 211,094. Renewed November 10, 1919. Serial No. 337,111.

*To all whom it may concern:*

Be it known that I, ERNEST G. DANN, a citizen of the United States, residing at Cleveland, in the county of Cuyahoga and State of Ohio, have invented certain new and useful Improvements in Methods of Manufacturing Composite Articles for Bearings or Other Purposes, of which the following is a specification.

My invention relates to a composite article consisting of a body of metal having incorporated therein at one or more surfaces thereof a substance which naturally does not adhere to the metal but which, in accordance with my invention, is so disposed and treated in such manner that its union with the metal is, for all practical purposes, permanent.

My invention is applicable to the manufacture of bearings, bushings or elements of various sorts where it is desirable to have a metal face permanently lubricated so that the use of oil or grease may be obviated or so that the amount used may be minimized; and the invention has for one of its more specific purposes the manufacture of bearing elements of this character; in which case the substance incorporated in the superficial portion or portions of the metal element will be of a lubricating character, such as graphite or a graphite composition. The invention, however, is not limited to this particular type of article but might be employed, for example, for rendering a metal surface abrasive instead of lubricated by the incorporation therein of a substance of abrasive character.

A composite article of the general type to be hereinafter described, together with one method for manufacturing the same, is disclosed in my co-pending application Serial No. 211,324, filed January 11, 1918. The present application relates to a somewhat different method of manufacture.

The accompanying drawings illustrate diagrammatically the method constituting my present invention as I prefer to practice it.

In the drawings—

Fig. 1 is a diagram illustrating apparatus employed for carrying out certain parts of the process.

Fig. 2 is a fragmentary view of the metal strip prepared for treatment in accordance with my invention.

Fig. 3 is a similar view on a much enlarged scale, showing a surface of the strip after it has been subjected to acid treatment.

Fig. 4 is a section on line 4—4 of Fig. 3.

Fig. 5 is a view similar to Fig. 3, but showing the strip filled with a lubricating substance.

Fig. 6 is a section on line 6—6 of Fig. 5, and

Fig. 7 is a section of the composite article when finished.

Like characters of reference designate like parts in the several figures of the drawings.

It will be obvious that the process of my invention might be used in connection with metal articles or bodies of any desired shape. For purposes of illustration, I have shown the manufacture of a strip of metal which is to be surfaced with a lubricating compound on one side thereof. This strip, indicated at A, has disposed thereon in spaced, intersecting, preferably diagonal lines indicated at $a$, a compound of any suitable character for protecting the portions of the surface so covered from the action of an acid. The strip so treated is then subjected to the acid, with the result that a plurality of recesses or cavities $a'$ are formed on one side of the strip. The acid is applied to the strip, preferably in the manner shown in Fig. 1, the strip passed over a roller B and then down and under a roller C, the latter located in the acid tank D. The acid is sprayed or thrown against the strip by means of a rotating paddle E. The reason for applying the acid to the strip in this manner is two-fold: In the first place, the acid can be made in this manner to penetrate the metal more deeply than would be the case if the strip were run through a quiet bath of the acid, and, in the second place, this method makes the operation a rapid one. Ordinarily, it will be understood, the other side of the strip and its edges are suitably coated with the stopping composition to prevent the acid from affecting them. From the roller D, the strip passes over rollers F and G, and then under a roller H in a washing and neutralizing vessel J. From there it passes over a roller K through a drying chamber L, over a roller M into a bath of the surfacing substance N, which is contained in a vessel O. In the manufacture of a bearing, this substance consists preferably of graphite and a binder, or other solid lubricating substance. The strip passes under a roller P and in leaving the vessel O the stopping composition on the smooth surface of the strip is scraped off by a scraper Q. The lubricating substance is forced into the cavities on the other side of the strip, as the strip passes over a rib R against which the scraper works.

Figs. 5 and 6 show a section of the strip after the cavities in one side thereof have been filled with bodies of the lubricating substance, as indicated at $n$. Preferably the acid is allowed to act upon the strip to a sufficient extent to undercut the cavities, as indicated in Figs. 4, 6 and 7. Preferably the apparatus is made adjustable, so that the distance between the rolls F and G may be varied, thereby increasing or diminishing the length of time intervening between the application of the acid to the strip and its removal therefrom in the washing vessel J.

After the strip has been loaded with the graphite composition, it is subjected to pressure for the purpose of compressing the bodies of graphite in the cavities, the intention being to give these bodies a maximum density, so that, inasmuch as they are prevented from displacement by the configuration of the cavities in which they are disposed, the surface of the bearing at these places will have as great a capacity for resisting pressure, the thrust of an object moving over such surface, for example, as the portions of the surface constituted by the intervening metal ridges. The pressing of the strip may be carried out by passing the strip through rollers. The bearing surface is smoothed down, the metal itself is compressed somewhat so as to increase the overhang at the edges of the cavities, and a thin film of the graphite is spread over the metal surfaces between the graphite bodies, as indicated at $n'$ (Fig. 7).

If the strip is to be worked into a particular shape, for example, bent into suitable form to provide a cylindrical bushing or shaft bearing, the bending or forming operation may be performed before the metal is subjected to pressure; or the metal may be preliminarily pressed in the flat, then formed and afterward subjected to a final pressing operation or such other treatment as may be necessary to make the lubricant dense and cause it to adhere with sufficient tenacity to the metal.

It is possible to manufacture, following the method above described, a composite article, for example, a bearing element consisting of a metal body surfaced with graphite in which the union between the graphite, which naturally does not adhere to the metal, and the metal will be, to all intents and purposes, permanent. When used as a bearing element, the graphite is so stably incorporated in the superficial portion of the metal article that it will wear away only as the metal wears away. While for the purpose of clearness of illustration, the lubricant cavities and the ribs $a^2$ of the metal intervening between them are shown on a large scale, in practice the cavities may be and are preferably quite minute, and the intervening ribs $a^2$ are as small as possible consistent with providing the cavities with firm and reliable retaining walls. The close juxtaposition of the lubricant bodies in the surface of the metal gives that surface the character of the lubricating substance, to all intents and purposes. The ribs $a^2$ between the cavities preferably run diagonally of the strip, or at least extend in a direction oblique to the line of intended movement over the bearing surface, so that when a movement occurs between the bearing element and the element which bears against the same, each point on the latter, assuming that the movement is of any considerable amplitude, will be certain to come into contact with one, at least, of the lubricant bodies. The film $n'$, which in the manufacture of the strip is spread over the intervening metal ribs $a^2$, is likely to be abraded in time, but the lubricated character of the surface is not thereby detrimentally affected to any appreciable extent. As a matter of fact, in most cases, the graphite so worn off from the bearing element will be forced into the pores of the metal surface bearing against such element, so that it is not wasted.

I claim:

1. Method of providing a metal body with a friction reducing surface which consists in forming a plurality of non-communicating under-cut cavities in the surface of the metal body by application of an acid thereto, and filling said cavities with a solid adherent lubricant.

2. Method of providing a metal body with a friction reducing surface which consists in forming a plurality of under-cut cavities in the surface of a metal body by application of an acid thereto, and filling said cavities with a graphite composition.

3. Method of providing a metal body with a friction reducing surface which consists in forming a plurality of under-cut cavities in the surface of the metal body by application of an acid thereto, filling said cavities with a solid adherent lubricant, and subjecting said surface to pressure.

4. Method of providing a metal body with a friction reducing surface which consists in forming by means of an acid a plurality of non-communicating cavities in a surface of a metal body disposed so that a minimum of metal intervenes between them, and filling said cavities with graphite.

5. Method of providing a metal body with a friction reducing surface which consists in disposing on the face of the metal body, in intersecting, spaced lines, a composition not affected by acid, subjecting the intervening uncovered portions of the metal to an acid to form non-communicating cavities in the metal, and filling said cavities with a solid adherent lubricant.

6. Method of manufacturing a composite article of the character described, which consists in disposing on the face of a metal element, in intersecting, spaced lines, a composition not affected by acid, subjecting the intervening uncovered portions of the metal to an acid to form cavities in the metal, and filling said cavities with graphite and compressing the same to maximum density.

7. Method of manufacturing a composite article of the character described, which consists in disposing on the face of a metal element, in intersecting, spaced lines, a composition not affected by acid, subjecting the intervening uncovered portions of the metal to an acid to form cavities in the metal, filling said cavities with a surfacing substance, and compressing the bodies of the substance in said cavities so as to permanently unite them with the metal.

8. Method of providing a metal body with a friction reducing surface which consists in covering the surface of the metal body with a substance not affected by an acid, but so as to leave uncovered a plurality of closely adjacent, minute areas, spraying said surface with an acid, washing the surface to remove the acid, and filling the cavities formed therein with a solid adherent lubricant.

ERNEST G. DANN.